(12) United States Patent
Dorn et al.

(10) Patent No.: US 11,914,146 B2
(45) Date of Patent: Feb. 27, 2024

(54) METHODS AND SYSTEMS FOR ADDING REAL-WORLD SOUNDS TO VIRTUAL REALITY SCENES

(71) Applicants: Sony Interactive Entertainment LLC, San Mateo, CA (US); Sony Interactive Entertainment Inc., Tokyo (JP)

(72) Inventors: Victoria Dorn, San Mateo, CA (US); Celeste Bean, San Francisco, CA (US); Tatianna Manzon-Gutzman, San Mateo, CA (US); Sarah Karp, Foster City, CA (US)

(73) Assignees: Sony Interactive Entertainment LLC, San Mateo, CA (US); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/827,462

(22) Filed: May 27, 2022

(65) Prior Publication Data
US 2023/0384592 A1    Nov. 30, 2023

(51) Int. Cl.
G06F 3/16    (2006.01)
G02B 27/01    (2006.01)
G06F 3/01    (2006.01)
H04S 7/00    (2006.01)

(52) U.S. Cl.
CPC ............ G02B 27/017 (2013.01); G06F 3/011 (2013.01); G06F 3/16 (2013.01); H04S 7/304 (2013.01)

(58) Field of Classification Search
CPC ......... G02B 27/017; G06F 3/011; G06F 3/16; H04S 7/304
See application file for complete search history.

(56) References Cited

U.S. PATENT DOCUMENTS

| | | |
|---|---|---|
| 2013/0236040 A1 | 9/2013 | Crawford et al. |
| 2015/0016641 A1* | 1/2015 | Ugur ............... G06F 3/167 |
| | | 381/303 |
| 2016/0212538 A1* | 7/2016 | Fullam ............... G06T 19/006 |
| 2017/0359467 A1 | 12/2017 | Norris et al. |
| 2018/0227426 A1 | 8/2018 | Norris et al. |
| 2019/0174002 A1 | 6/2019 | Norris et al. |
| 2019/0387102 A1 | 12/2019 | Norris et al. |
| 2020/0134298 A1* | 4/2020 | Zavesky ............... H04N 7/157 |
| 2021/0092232 A1 | 3/2021 | Norris et al. |
| 2022/0201126 A1 | 6/2022 | Norris et al. |

OTHER PUBLICATIONS

PCT/US2023/020902, Notification of Transmittal of the International Search Report and the Written Opinion of the International Searching Authority, or the Declaration, PCT/ISA/220, and the International Search Report, PCT/ISA/210, dated Jul. 25, 2023.

* cited by examiner

*Primary Examiner* — Sanghyuk Park
(74) *Attorney, Agent, or Firm* — Penilla IP, APC

(57) ABSTRACT

Methods and systems are provided for integrating media cues into virtual reality scenes presented on a head mounted display (HMD) is disclosed. The method includes presenting a virtual reality scene on a display of an HMD. The method further includes receiving sensor data from one or more sensors in a real-world space in which the HMD is located. Then, identifying an object location of an object in the real-world space that produces a sound. The method includes generating a media cue in the virtual reality scene presented in the HMD. The media cue is presented in a virtual location that is correlated to the object location of the object in the real-world space.

13 Claims, 4 Drawing Sheets

METHODS AND SYSTEMS FOR ADDING REAL-WORLD SOUNDS TO VIRTUAL REALITY SCENES

1. FIELD OF THE DISCLOSURE

The present disclosure relates generally to integrating media cues into virtual reality scenes for conveying real-world environment objects and sounds.

BACKGROUND

2. Description of the Related Art

The video game industry has seen many changes over the years, including many advances in head mounted display (HMD) technology. HMD use usually includes a headset and earphones that allow a user to become very immersed in virtual reality content displayed to a screen of the HMD. In some cases, the virtual reality content can be very intense and can cause users to mentally separate themselves from the real world.

Although the push for more and more realistic content is a good thing, there are also potential problems with users being unable to connect with their real-world environment. By way of example, users that become fully immersed in virtual reality content may be unable to respond to persons or things present in their space.

It is in this context that implementations of the disclosure arise.

SUMMARY

Implementations of the present disclosure include methods, systems, and devices for integrating media cues into virtual reality scenes for conveying real-world environment objects and sounds.

In one embodiment, a method for integrating media cues into virtual reality scenes presented on a head mounted display (HMD) is disclosed. The method includes presenting a virtual reality scene on a display of an HMD. The method further includes receiving sensor data from one or more sensors in a real-world space in which the HMD is located. Then, identifying an object location of an object in the real-world space that produces a sound. The method includes generating a media cue in the virtual reality scene presented in the HMD. The media cue is presented in a virtual location that is correlated to the object location of the object in the real-world space.

In some embodiments, the virtual location of the media cue is presented relative to a point of view (POV) of the HMD of an HMD user.

In some embodiments, the media cue is image data for conveying the sound, and the image data provides an indicator of direction of the sound relative to the POV of the HMD.

In some embodiments, the media cue is audio data for conveying the sound, and the audio data provides an indicator of direction of the sound relative to the POV of the HMD.

In some embodiments, the media cue is image data that conveys identify of the object in a graphical form.

In some embodiments, the media cue is audio data that is captured from the real-world space and integrated with native audio from the virtual reality scene.

In some embodiments, the media cue is a combination of audio data and image data for conveying identify of the object and context for the sound.

In some embodiments, the virtual location of the media cue is dynamically changed based on changes or movements of the object in the real-world space.

In some embodiments, the virtual location of the media cue moves based on movements of the object in the real-world space, and the media cue includes audio data and image data for updating the correlation of the object location of the object in the real-world space relative to the POV of the HMD.

In some embodiments, the HMD includes headphones presenting audio related to the virtual reality space and the headphones include a noise canceling process for reducing the sound from the real-world space.

In some embodiments, the media cue is audio data, the audio data is the sound captured from the real-world space and said sound is mixed with the audio related to the virtual reality space for output via said headphones.

In some embodiments, the media cue is audio data, the audio data is a computer-generated sound that represents the sound captured from the real-world space, and said computer generated sound is mixed with the audio related to the virtual reality space for output via said headphones.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1:
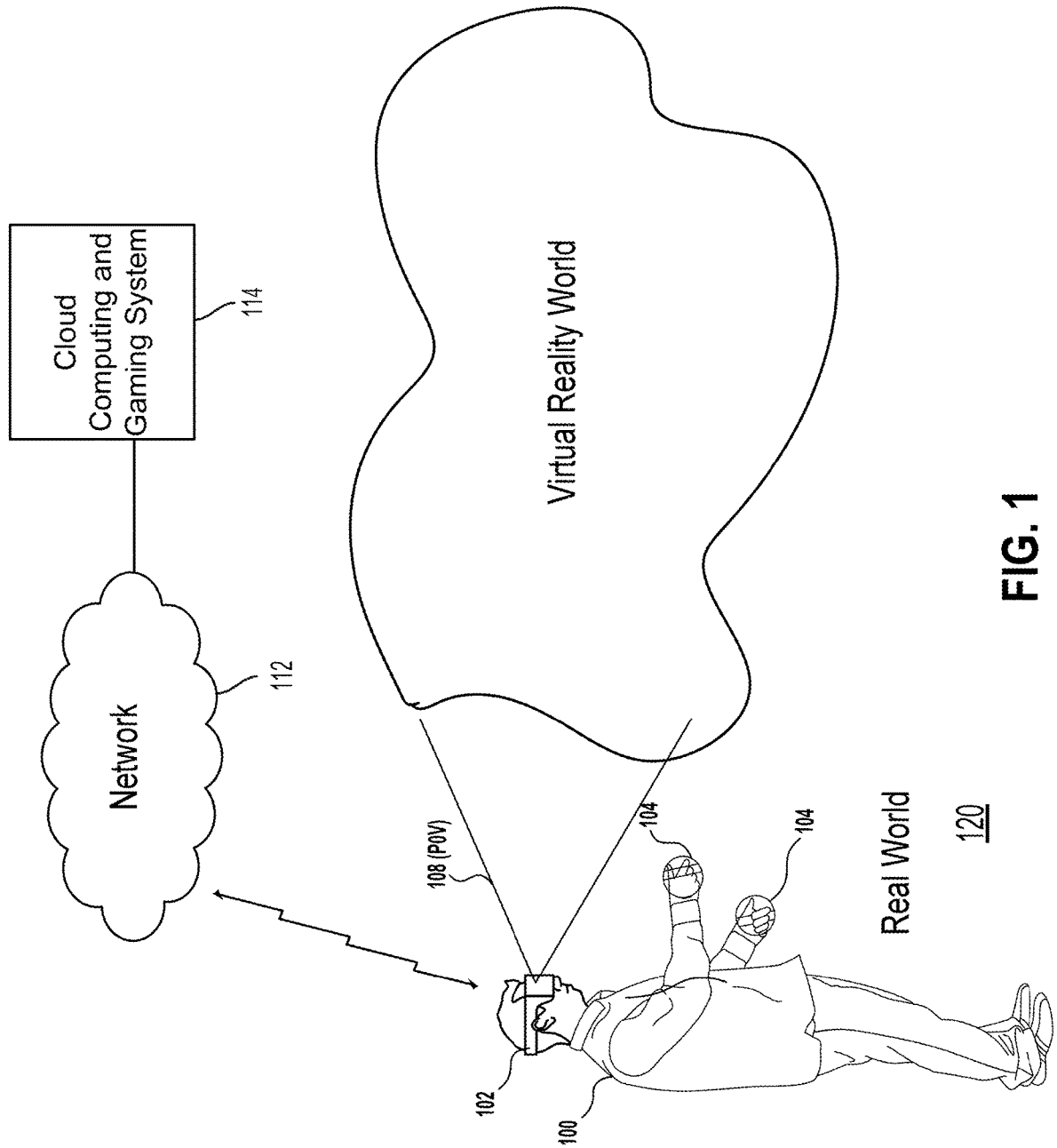
FIG. 1 illustrates an embodiment of a system for interaction with a virtual environment via a head-mounted display (HMD), in accordance with implementations of the disclosure.

The following implementations of the present disclosure provide methods, systems, and devices for integrating media cues into virtual reality scenes for conveying real-world environment objects and sounds.

Virtual reality scenes are typically presented via head mounted displays (HMDs). Users wearing an HMD are typically able to immerse themselves in the virtual-reality scenes. Although this is a preferred way of interacting with virtual-reality scenes, users lack the ability to interact with real-world environments. Sometimes, real-world environments include people or things that produce sounds. These other sounds can include other people, objects being moved, objects that may approach the user, or objects that are fixed.

For safety purposes, if the HMD user remains unaware of these sounds, the user may be placed in a non-safe position. In one embodiment, sensors are utilized in the environment of the HMD user. The sensors can include separate sensors in the environment or sensors associated with the HMD or peripherals used with the HMD. In some embodiments, the sensors can include microphones, cameras, motion detectors, proximity sensors, infrared sensors, sound sensors, or a combination thereof. Sometimes, the sensors are built into the HMD or peripherals, such as outward facing cameras, motion sensors, proximity sensors, and the like.

In one embodiment, one or more of the sensors can be utilized to continuously map the real-world space during HMD use. The mapping of the real-world space will include identifying a location of the sounds using one or more of said sensors, identifying objects, identifying an identify of a person or persons, etc. In order to not interrupt the HMD user in an awkward manner, notification signals can be provided to the HMD user by way of adding image cues of real-world sounds, adding visual indicators showing where sounds are coming from in the real-world relative to the real-world user of the HMD, and combinations thereof.

In one example, if a person is entering the room from the left and attempting to speak to the HMD user, a sound can be generated and mixed with the virtual-reality audio. The sound can be a generated sound of a door opening or footsteps coming from the left. In some configurations, a headset of the HMD can incorporate noise canceling processing. If the HMD user is not able hear the real-world sounds, the incorporation of visual/graphical cues into the virtual world and/or audio, the HMD user can naturally hear real-world sounds mixed or blended into the virtual-reality audio. In one embodiment, the sounds that are mixed with the virtual-reality audio will resemble those sounds that occurred in the real-world, but are added in a way that is realistic to the virtual environment.

In some embodiments, the visual cues can be integrated to pop-ups, icons, graphics, or images that appear in the virtual-reality space. The location of the integrated visual cues is placed in the VR scene in a location that relates or corresponds to where the real-world sound comes from. If the sound is coming from the right, the visual cue can make a sound wave or sound cue to the right side of the screen or to the right side of the user's interactive environment. This provides a natural way for the HMD user to be notified of sounds that are occurring in the real-world space, in a way that is more natural to the HMD environment. In some embodiments, filters can be added to remove certain sounds that are occurring in the real-world space and replace those real-world sounds with computer-generated sounds that mimic those sounds. In an example of a door opening to the right, the door sound in the real world is filtered out using noise canceling or filtering. In place of the real-world sound that can have background noise, a new computer-generated sound of a door opening and emanating from the right can be provided and mixed for delivery to the headset of the HMD.

With the above overview in mind, the following provides several example figures to facilitate understanding of the example embodiments.

FIG. 1 illustrates an embodiment of a system for interaction with a virtual environment via a head-mounted display (HMD), in accordance with implementations of the disclosure. An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space. For example, the user may see a three-dimensional (3D) view of the virtual space when facing in a given direction, and when the user turns to a side and thereby turns the HMD likewise, then the view to that side in the virtual space is rendered on the HMD.

As illustrated in FIG. 1, a user 100 is shown physically located in a real-world space 120 wearing an HMD 102 and operating interface objects 104 (e.g., VR peripheral input controllers) to provide input for the video game. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user, and may also provide viewing with three-dimensional depth and perspective. The HMD 102 is associated with headphones, which provide audio to the user 100. The HMD 102 can include noise canceling hardware and/or software, which helps block some or most of the real-world sounds in the real-world space 120. Sounds that are usually blocked are noises that could interfere with the user's enjoyment of the content presented on the HMDs. These noises can include noises produced by objects, by other people talking, background music, traffic sounds, city sounds, miscellaneous home sounds, and the like.

In some embodiments, the HMD 102 may provide a user with a game play point of view (POV) 108 into the VR scene. Accordingly, as the user 100 turns their head and looks toward different regions within the VR environment, the VR scene is updated to include any additional virtual objects that may be present relative to the game play POV 108 of the user 100. In one embodiment, the HMD 102 may include a gaze tracking camera that is configured to capture images of the eyes of the user 100 while the user interacts with the VR scenes.

In some embodiments, the HMD 102 may include an externally facing camera that is configured to capture images of the real-world space 120 of the user 100 such as the body movements of the user and any real-world objects that may be located in the real-world space. The externally facing camera of the HMD 102 is a type of sensor that can capture image data of the real-world space. Other sensors may include proximity sensors on the HMD or controllers 104, or sensors placed in the space where the HMD user 100 is located. In some embodiments, the images captured by the externally facing camera can be analyzed to determine the location/orientation of the real-world objects relative to the HMD 102. In other embodiments, the HMD 102 may include one or more lights which can be tracked to determine the location and orientation of the HMD 102.

As noted above, the user 100 may operate interface objects 104 to provide input for the video game. In various implementations, the interface objects 104 include a light which can be tracked, and/or inertial sensor(s), to enable determination of the interface object's location and orientation and tracking of movements. The way the user interfaces with the virtual reality scene displayed in the HMD 102 can vary, and other interface devices in addition to interface object 104, can be used. For instance, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

In the illustrated implementation, the HMD 102 is wirelessly connected to a cloud computing and gaming system 114 over a network 112. In one embodiment, the cloud computing and gaming system 114 maintains and executes the video game being played by the user 100. In some embodiments, the cloud computing and gaming system 114 is configured to receive inputs from the HMD 102 and the interface objects 104 over the network 112. The cloud computing and gaming system 114 is configured to process the inputs to affect the game state of the executing video game. The output from the executing video game, such as video data, audio data, and haptic feedback data, is transmitted to the HMD 102 and the interface objects 104. For example, video and audio streams are provided to the HMD 102, whereas a haptic/vibration feedback command is provided to the interface objects 104. In other implementations, the HMD 102 may communicate with the cloud computing and gaming system 114 wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

Figure 2:
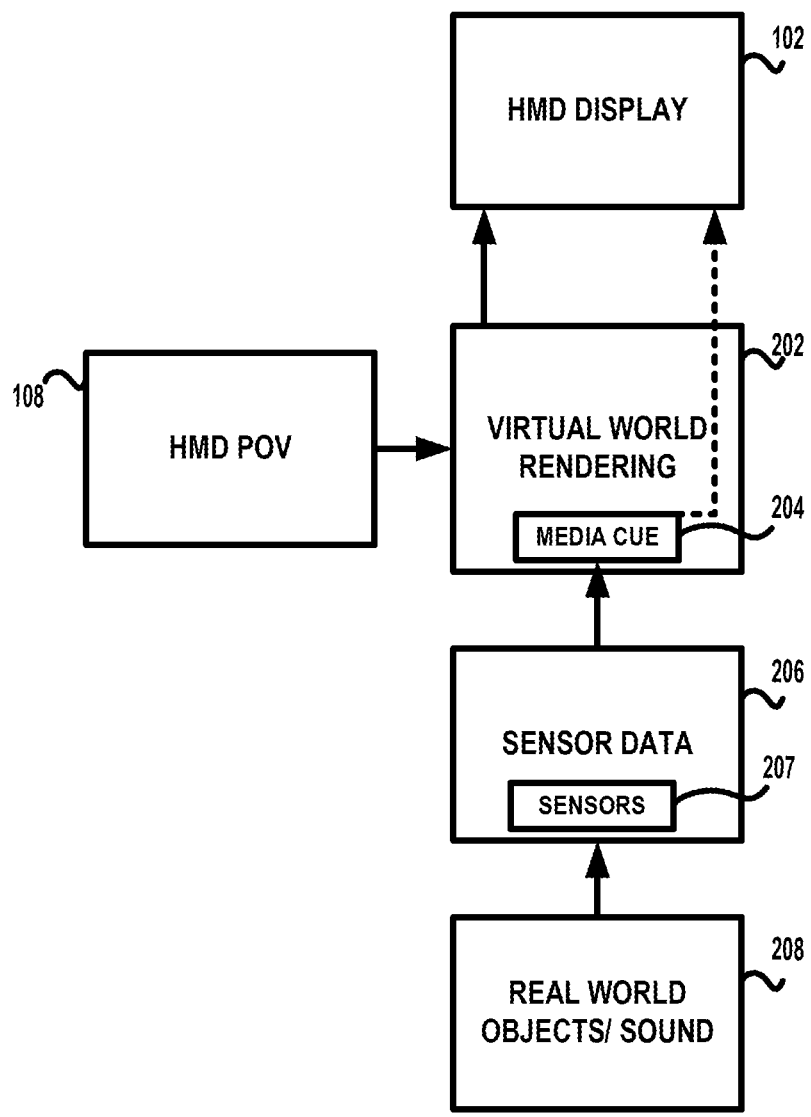
FIG. 2 illustrates a block diagram of the process for generating media cues that are integrated with virtual-reality scenes provided to an HMD display, in accordance with one embodiment.

FIG. 2 illustrates a block diagram of the process for generating media cues that are integrated with virtual-reality scenes provided to an HMD display 102, in accordance with one embodiment. The HMD point of view (POV) 108 of the user wearing the HMD 102 is tracked, and utilize for providing different views into the virtual-reality world being rendered by virtual world rendering module 202. In one embodiment, the virtual world rendering module 202 is provided by software and hardware that drives functionality of the HMD and processing for rendering multimedia content in the HMD display 102. Sensor data 206 is collected from the real-world space in which the HMD user 100 is located. The sensor data 206 can be collected from a number of sensors, which can be associated with the HMD 102.

In one embodiment, the sensors 207 can be integrated with the HMD 102. The sensors 207 can include cameras, motion detectors, ultrasonic sensors, microphone sensors, infrared sensors, inertial sensors, and combinations thereof. In some embodiments, sensors 207 can include sensors installed or located within the space and location in which the HMD user 100 is located. By way of example, a camera can be located proximate to a location where the user 100 is utilizing the HMD. In those circumstances, cameras are referred to as outside in tracking cameras. In other embodiments, if the cameras of the HMD are utilized (e.g., and outward facing camera integrated with the HMD), those cameras are referred to as inside out tracking cameras. In one embodiment, real-world objects can include live objects, such as humans or animals (e.g., pets) present in the space where the HMD user 100 is utilizing the HMD 102. In other embodiments, the objects can include fixed objects, such as furniture, building objects, robots, or other non-living objects.

In still other embodiments, the real-world objects can include a combination of people, animals, and physical structural things present in the location where the HMD user 100 is present. In one embodiment, the real-world objects can produce sounds, which can be detected utilizing sensors 207. By way of example, microphones integrated with the HMD 102 can pick up sounds that are occurring in the proximity space of the HMD user 100. Beamforming processing can be performed utilizing multiple microphones of the HMD 102, in order to identify the location of the sounds relative to the location of the HMD 102.

The sensor data 206 collected from the space proximate to the HMD user 100 can then be processed to generate media cues 204, by the real-world rendering module 202. In one embodiment, a media cue can include audio data or image data, which can be integrated into scenes generated by the virtual world rendering module 202. As used herein, the virtual world rendering module 202 can be generating virtual reality content for a video game, or a space associated with a meta-verse. Accordingly, is not required that the virtual world rendering module to produce gaming environments, but simply provide virtual-reality scenes that are presented to the HMD display 102. In accordance with one embodiment, the HMD point of view 108 is tracked, such that the virtual world rendering module 202 can present different views to the user wearing the HMD.

When sensors 207 detect sounds in the space near or proximate to the user 100, the location of those sounds is identified and tracked as the HMD POV 108 changes and moves about during interactivity. In one embodiment, the detected sounds by the sensors 207 can be processed by the virtual world rendering module 202, or software associated therewith. The processing will allow for the generation of the media cue 204, which is then integrated into images of the virtual-reality scene presented in the HMD display 102.

The integration of images for the media cue 204 can include overlay content, which is strategically placed on the display in a location that is correlated or mapped relative to the location of the user 100, and the HMD POV 108. By way of example, if a sound is coming to the right of the user in the real-world space, the media cue 204 can be integrated into the virtual-reality scene in the rightmost area of the display. Likewise, if the sound comes from the left, from the top, from below, or any other area, the integration of the media cue 208, whether it be audio data or image data, it's integration will be presented with reference to the location of the sound and or object in the real-world space.

Figure 3:
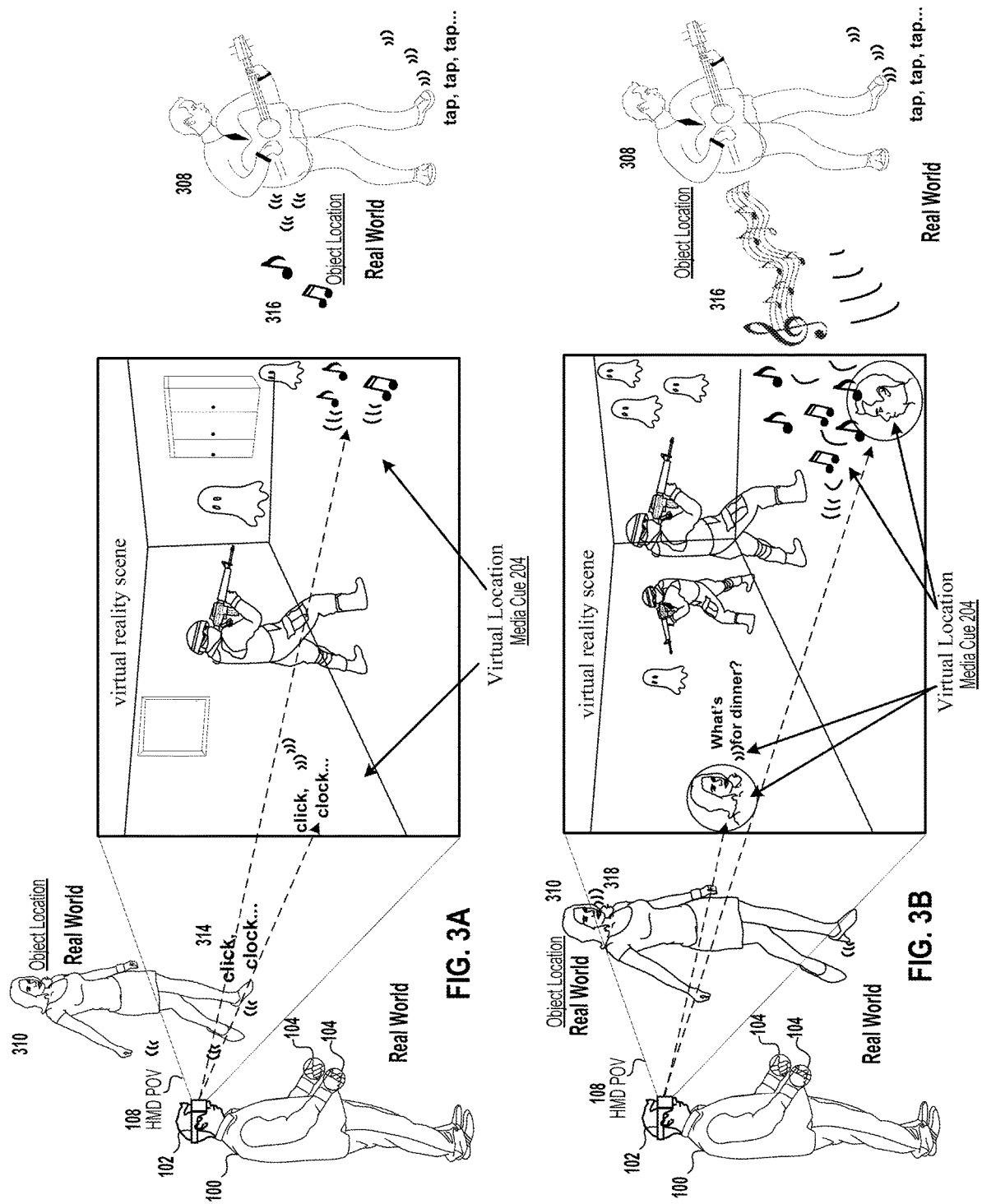
FIG. 3A illustrates an example of a user utilizing an HMD and controllers for interacting with a virtual-reality scene, in accordance with one embodiment.
FIG. 3B illustrates an example where the media cues continue to be displayed in the virtual-reality scene, in accordance with an implementation of the disclosure.

FIG. 3A illustrates an example of a user 100, utilizing HMD 102 and controllers 104, for interacting with a virtual-reality scene, in accordance with one embodiment. In this example, it is shown that the user 100 has a point of view 108 directed into the scene, which provides viewing of interactivity of a game. The game in this example, is a first-person shooter game, and the first person is shooting at ghosts. In the illustrated example, the real-world objects are presented as creating sounds, proximate to the user 100.

By way of example, a person 310 is shown in the real-world walking toward user 100. As the person 310 walks toward user 100, the person 300 has shoes that make a click clock sound 314. The click clock sound 314 is picked up by a sensor (e.g. one or more microphones) of the HMD 102, or controller 104, or microphones located in the space near with user 100. In one embodiment, the sound 314 is processed by the virtual world rendering module 202, which then generates a media cue 204. The media cue 204 is shown as a text "click clock . . . ".

It should be appreciated that the media cue 204 is rendered in the virtual-reality scene slightly to the left, which is correlated to the approximate location of person 310 approaching user 100. At the same time, person 308 may be located near user 100 in the real-world. In this example, person 308 may be playing a guitar and tapping his foot. These sounds are captured by one or more microphones (sensors), which are then processed in order to generate a media cue 204, that is also shown rendered in the virtual-reality scene. The sound of the real-world object, in this example person 308 and sounds, are graphically illustrated in the right portion of the virtual-reality scene, as being correlated to the location of person 308 relative to person 100, and the point of view 108 of the HMD 102.

In one embodiment, the media cue 204 is rendered simply as image data. The image data can simply be the example text or graphics shown in FIG. 3A. In other embodiments, in addition to rendering text, and graphics, the media cue 204 can also include audio data. The audio data can be mixed with the sounds of the virtual-reality scene as being listened to by user 100. In some embodiments, the HMD 102 may include noise canceling functionality, such that user 100 will not be able to listen to sounds coming from the real-world. However, the microphones of the HMD 102 will detect those sounds 314 and 316, and render those sounds in the virtual-reality scene as image data and also as audio data, which is mixed with the audio of the virtual-reality scene. In this manner, although the user 100 has noise canceling headphones associated with HMD 102, user 100 will still be able to understand where sounds are coming from in the real-world, and can take appropriate action.

In one embodiment, the user can pause the game, the user can discontinue playing, or the user can simply speak out and ask a nearby person or object to wait or be quiet for a second or some time. This provides the HMD user with the ability to continue playing uninterrupted or if interruption is desired, to discontinue playing with knowledge of the sounds that are occurring in the real-world.

FIG. 3B illustrates an example where the media cue 204 continues to be displayed in the virtual-reality scene. As shown, the activity in the virtual-reality scene may become more intense, and the HMD user 100 may not wish to stop. However, the sounds coming from the real-world may become more urgent or require the attention of the user 100. The example of person 310 shows that a sound 318 may be generated by the voice of person 310. The voice can be captured by one or more sensors as described above, and can be integrated into the virtual-reality scene as text.

In addition, if the person 310 is identified by one or more cameras/sensors, an image of that person 310 can be generated and added as a media cue 204 into the virtual-reality space. Again, the integration of the media cue 204 is with spatial relevance and correlation to the location where person 310 is standing and speaking relative to user 100. Thus, the media cue 204 is rendered to the left of the images shown in the HMD 102.

The sounds coming from person 308 can become more intense, as shown by sounds 316 being directed toward the user 100 from the right. In one embodiment, the intensity of the sound 316 can also be shown in the virtual-reality scene by additional graphics, and possible integration of the sound into the sounds of the virtual-reality scene. Additionally, it may be possible to identify the person 308, and provide an image of that person into the virtual-reality space, in correlation to the sounds been rendered in the virtual-reality scene.

In this manner, user 100 can identify the location a person 308, and also know the identity of person 308. In one embodiment, knowing the identity of the person or things that are present making sounds near the user 100, will allow user 100 to make a determination as to whether stopping gameplay or interactivity in a meta-verse is appropriate. Additionally, by providing the media cues 204 in locations relative to the physical locations in the real-world relative to user 100, user 100 can move around more safely in the real-world without accidents or bumping into other people, things, pets, and the like.

Figure 4:
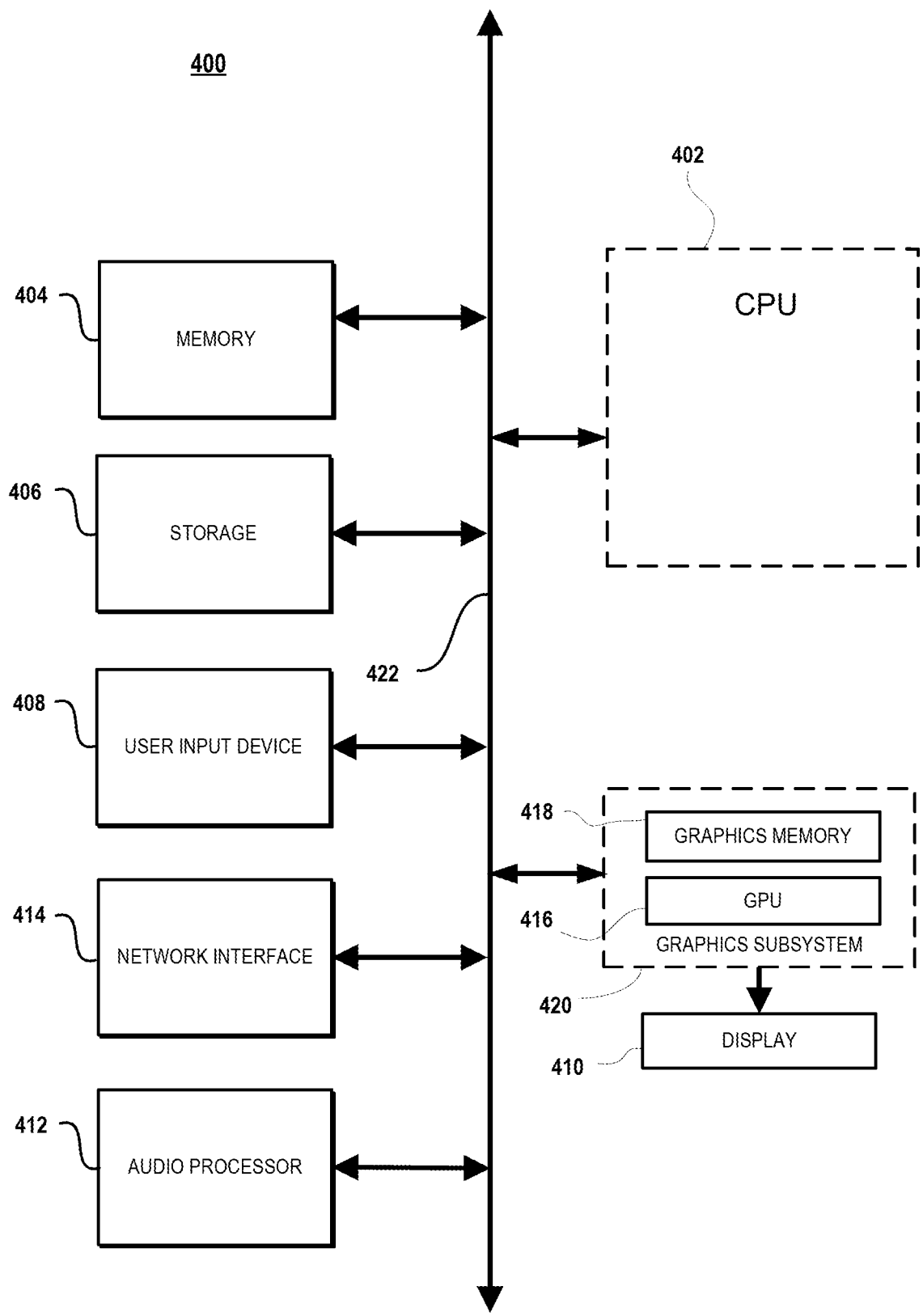
FIG. 4 illustrates components of an example device that can be used to perform aspects of the various embodiments of the present disclosure.

FIG. 4 illustrates components of an example device 400 that can be used to perform aspects of the various embodiments of the present disclosure. This block diagram illustrates a device 400 that can incorporate or can be a personal computer, video game console, personal digital assistant, a server or other digital device, suitable for practicing an embodiment of the disclosure. Device 400 includes a central processing unit (CPU) 402 for running software applications and optionally an operating system. CPU 402 may be comprised of one or more homogeneous or heterogeneous processing cores. For example, CPU 402 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 400 may be localized to a player playing a game segment (e.g., game console), or remote from the player (e.g., back-end server processor), or one of many servers using virtualization in a game cloud system for remote streaming of gameplay to clients.

Memory 404 stores applications and data for use by the CPU 402. Storage 406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 408 communicate user inputs from one or more users to device 400, examples of which may include keyboards, mice, joysticks, touch pads, touch screens, still or video recorders/cameras, tracking devices for recognizing gestures, and/or microphones. Network interface 414 allows device 400 to communicate with other computer systems via an electronic communications network, and may include wired or wireless communication over local area networks and wide area networks such as the internet. An audio processor 412 is adapted to generate analog or digital audio output from instructions and/or data provided by the CPU 402, memory 404, and/or storage 406. The components of device 400, including CPU 402, memory 404, data storage 406, user input devices 408, network interface 410, and audio processor 412 are connected via one or more data buses 422.

A graphics subsystem 420 is further connected with data bus 422 and the components of the device 400. The graphics subsystem 420 includes a graphics processing unit (GPU) 416 and graphics memory 418. Graphics memory 418 includes a display memory (e.g., a frame buffer) used for storing pixel data for each pixel of an output image. Graphics memory 418 can be integrated in the same device as GPU 408, connected as a separate device with GPU 416, and/or implemented within memory 404. Pixel data can be provided to graphics memory 418 directly from the CPU 402. Alternatively, CPU 402 provides the GPU 416 with data and/or instructions defining the desired output images, from which the GPU 416 generates the pixel data of one or more output images. The data and/or instructions defining the desired output images can be stored in memory 404 and/or graphics memory 418. In an embodiment, the GPU 416 includes 3D rendering capabilities for generating pixel data for output images from instructions and data defining the geometry, lighting, shading, texturing, motion, and/or camera parameters for a scene. The GPU 416 can further include one or more programmable execution units capable of executing shader programs.

The graphics subsystem 414 periodically outputs pixel data for an image from graphics memory 418 to be displayed on display device 410. Display device 410 can be any device capable of displaying visual information in response to a signal from the device 400, including CRT, LCD, plasma, and OLED displays. Device 400 can provide the display device 410 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for integrating media cues into virtual reality scenes presented on a head mounted display (HMD), comprising:

presenting a virtual reality scene on a display of an HMD, the HMD includes headphones for outputting audio related to the virtual reality space and the headphones use a noise canceling process for reducing the sound from a real-world space;

receiving sensor data from one or more sensors in a real-world space in which the HMD is located;

identifying an object location of an object in the real-world space that produces a sound using the sensor data; and generating a media cue in the virtual reality scene presented in the HMD, the media cue is presented in a virtual location that is correlated to the object location of the object in the real-world space, the media cue is rendered as audio data associated with the sound that is captured from the real-world space and is mixed with audio related to the virtual reality space when output via said headphones;

wherein interactivity and audio related to the virtual reality scene is active when the media cue is presented.

2. The method of claim 1, wherein the virtual location of the media cue is presented relative to a point of view (POV) of the HMD of an HMD user.

3. The method of claim 1, wherein the media cue is additionally represented as image data for conveying the sound, the image data provides an indicator of direction of the sound relative to the POV of the HMD.

4. The method of claim 1, wherein the media cue is additionally represented as image data that conveys an identity of the object in a graphical form.

5. The method of claim 1, wherein the audio related to the virtual reality space native audio from the virtual reality scene.

6. The method of claim 1, wherein the virtual location of the media cue is dynamically changed based on changes or movements of the object in the real-world space.

7. The method of claim 1, wherein the virtual location of the media cue moves to represent movements of the object in the real-world space, and updating a correlation of the object location of the object in the real-world space relative to the POV of the HMD.

8. The method of claim 1, wherein the audio data is a computer-generated sound that represents the sound that is captured from the real-world space.

9. Computer readable media being non-transitory and having program instructions for integrating media cues into virtual reality scenes presented on a head mounted display (HMD), comprising:

program instructions for presenting a virtual reality scene on a display of an HMD, the HMD includes headphones for outputting audio related to the virtual reality space and the headphones use a noise canceling process for reducing the sound from a real-world space; program instructions for receiving sensor data from one or more sensors in a real-world space in which the HMD is located;

program instructions for identifying an object location of object in the real-world space that produces a sound using the sensor data; and program instructions for generating a media cue in the virtual reality scene presented in the HMD, the media cue is presented in a virtual location that is correlated to the object location of the object in the real-world space, the media cue is rendered as audio data associated with the sound that is captured from the real-world space and is mixed with audio related to the virtual reality space when output via said headphones;

wherein interactivity and audio related to the virtual reality scene is active when the media cue is presented.

10. The computer readable media of claim 9, wherein the virtual location of the media cue is presented relative to a point of view (POV) of the HMD of an HMD user.

11. The computer readable media of claim 9, wherein the media cue is additionally represented as image data for conveying the sound, the image data provides an indicator of direction of the sound relative to the POV of the HMD.

12. The computer readable media of claim 9, wherein the virtual location of the media cue moves based on movements of the object in the real-world space, and updating a correlation of the object location of the object in the real-world space relative to the POV of the HMD.

13. The computer readable media of claim 9, wherein the media cue is a computer-generated sound that represents the sound captured from the real-world space.

* * * * *